US009773424B2

(12) United States Patent
Blackburn et al.

(10) Patent No.: US 9,773,424 B2
(45) Date of Patent: Sep. 26, 2017

(54) FIRE FIGHTING TRAINING SYSTEM WITH INTEGRATED EXTINGUISHANT SENSOR

(71) Applicant: Lion Apparel, Inc., Dayton, OH (US)

(72) Inventors: John Joseph Blackburn, Rensselaer, NY (US); Matthew Brian Krolick, Guilderland, NY (US); Daniel A. Goldman, Albany, NY (US); Kyle Thomas Edwards, Ballston Lake, NY (US); Michael Patrick Waterhouse, Voorheesville, NY (US); Cary John Vaeth, Scotia, NY (US); Evan Andrew Ladd, Amsterdam, NY (US)

(73) Assignee: LION GROUP, INC., Dayton, OH (US)

( * ) Notice: Subject to any disclaimer, the term of this patent is extended or adjusted under 35 U.S.C. 154(b) by 251 days.

(21) Appl. No.: 14/487,831

(22) Filed: Sep. 16, 2014

(65) Prior Publication Data
US 2015/0079558 A1 Mar. 19, 2015

Related U.S. Application Data

(60) Provisional application No. 61/878,199, filed on Sep. 16, 2013.

(51) Int. Cl.
G09B 5/02 (2006.01)
A62C 99/00 (2010.01)
G09B 19/00 (2006.01)

(52) U.S. Cl.
CPC ............ *G09B 5/02* (2013.01); *A62C 99/0081* (2013.01); *G09B 19/00* (2013.01)

(58) Field of Classification Search
CPC ...... A62C 99/0081; G09B 9/00; G09B 19/00; G09B 5/02
See application file for complete search history.

(56) References Cited

U.S. PATENT DOCUMENTS

| 4,001,949 | A | 1/1977 | Francis |
| 5,233,869 | A | 8/1993 | Rogers et al. |
| 6,900,795 | B1 | 5/2005 | Knight, III et al. |
| 7,748,983 | B2 | 7/2010 | Blackburn et al. |
| 7,965,257 | B2 | 6/2011 | Perkins et al. |
| 8,096,810 | B2 | 1/2012 | Blackburn et al. |
| 8,362,970 | B2 | 1/2013 | Perkins et al. |
| 8,427,391 | B2 | 4/2013 | Perkins et al. |

(Continued)

FOREIGN PATENT DOCUMENTS

EP 1905486 4/2008

OTHER PUBLICATIONS

EP, Supplementary European Search Report and Opinion, Patent Application No. 14843333.7, 6 pages. (Feb. 3, 2017).

(Continued)

*Primary Examiner* — Timothy A Musselman
(74) *Attorney, Agent, or Firm* — Thompson Hine LLP

(57) ABSTRACT

A system for developing firefighting skills including a display device configured to display a simulated fire, wherein the display device has a front surface. The system further includes a sensor configured to detect an actual or simulated extinguishant that is directed at the front surface, wherein the sensor is directly coupled to the front surface of the display device.

29 Claims, 1 Drawing Sheet

(56) References Cited

U.S. PATENT DOCUMENTS

2008/0158178 A1* 7/2008 Hotelling ............... G06F 3/044
                                              345/173
2009/0197229 A1   8/2009 Blackburn
2010/0304345 A1  12/2010 Blackburn et al.

OTHER PUBLICATIONS

PCT, International Search Report and Written Opinion, PCT/US2014/055849, Dec. 22, 2014.

* cited by examiner

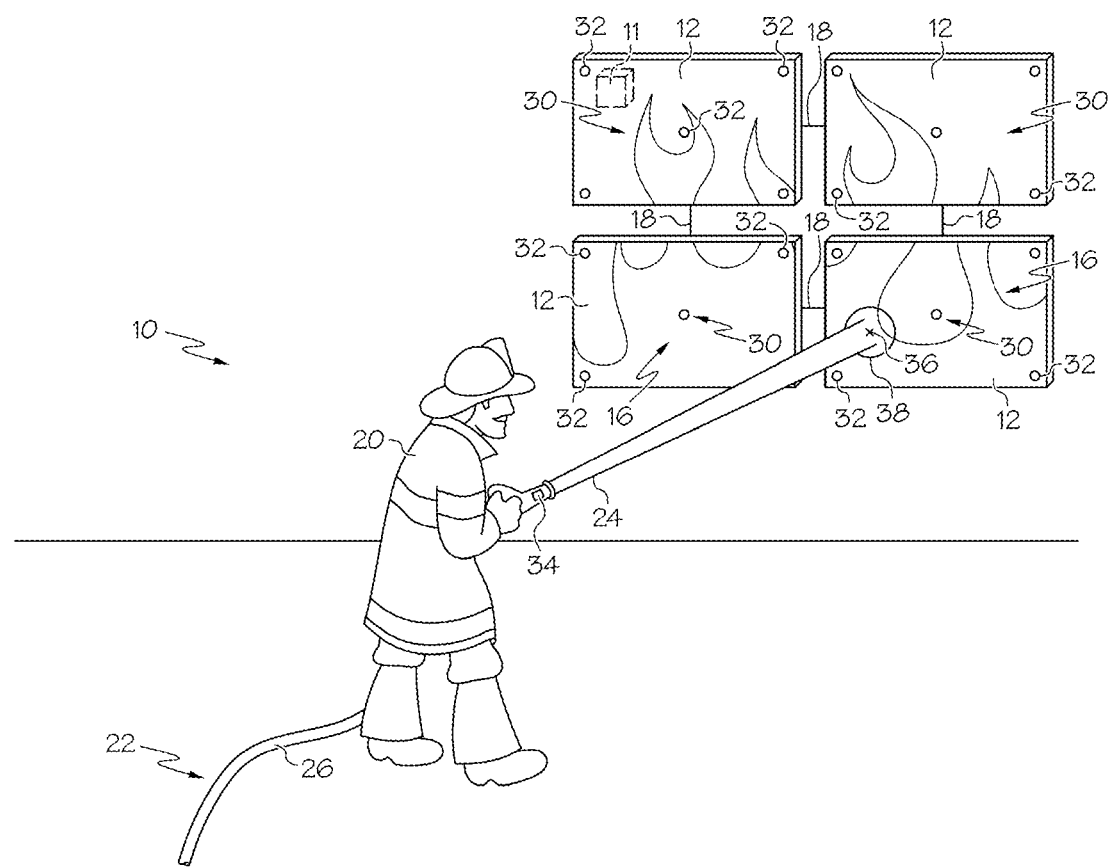

FIRE FIGHTING TRAINING SYSTEM WITH INTEGRATED EXTINGUISHANT SENSOR

This application claims priority to U.S. Provisional Patent Application Ser. No. 61/878,199, filed on Sep. 16, 2013 and entitled FIRE FIGHTER TRAINING SYSTEM WITH INTEGRATED EXTINGUISHANT SENSOR, the entire contents of which are hereby incorporated by reference.

This application is directed to a system and method for teaching users firefighting skills and techniques.

BACKGROUND

Fire fighter trainers and simulators are used to train fire fighters and other individuals, including in some cases members of the general public and those without specialized training, in proper firefighting techniques. Such trainers and simulators may provide a realistic but simulated firefighting environment by utilizing simulated flames that can react to actual or simulated extinguishants. It may be desired to accurately measure the performance of the trainee so that feedback can be provided and firefighting techniques improved.

SUMMARY

In one embodiment, the present invention is a system and method for training users in proper firefighting technique by providing accurate feedback to the user. More particularly, in one embodiment, the invention is a system for developing firefighting skills including a display device configured to display a simulated fire, wherein the display device has a front surface. The system further includes a sensor configured to detect an actual or simulated extinguishant that is directed at the front surface, wherein the sensor is directly coupled to the front surface of the display device.

In another embodiment the invention is a system for developing firefighting skills including a display device configured to display a simulated fire and a sensor system configured to detect an actual or simulated extinguishant that is directed at the simulated fire. The sensor system is configured to determine a location and a magnitude of the extinguishant impinging upon said display device.

BRIEF DESCRIPTION OF THE DRAWINGS

FIG. 1 is a schematic view of one embodiment of the fire fighter training device of the present invention.

DETAILED DESCRIPTION

As shown in FIG. 1, in one embodiment a training system, generally designated 10, includes a plurality of display, processing, sensing and control devices 12 (each termed a "display device" 12 herein) operatively coupled to each other, although only a single display device 12 may be used. In one case each display device 12 takes the form of a LED or OLED display or panel that is analogous to, or generally the same as, a LED television screen, although other technologies for the display devices 12 can be utilized, such as CRT, digital light processing, plasma, etc., so long as the display devices 12 can be made sufficiently fluid-tight (in appropriate circumstances) and are able to resist forces applied during training exercises. The display devices 12 can include a light source and display screen integrated into a single unit (e.g. positioned within an external casing, with the light source being behind the display screen), with both being positioned within or coupled to a single housing such that each display 12 screen is in one case relatively compact and manually carryable.

Each display device 12 can include a controller 11, such as a processor, microcomputer or the like (one of which is shown in FIG. 1), stored therein wherein each controller 11 is configured to receive and process inputs and provide outputs, including an output which can control the displayed image 16. In addition, the display devices 12 can be networked together, such as via cables 18 or wirelessly, so that the display devices 12, and more particularly their controllers 11, can communicate. In this case, the system 10 lacks a central controller, and each display device 12 includes a controller 11 such that the display devices 12 can be connected together, with more display devices 12 added or display devices 12 removed, as desired in a modular manner. However, if desired a central controller can be utilized.

In one case, each display device 12 includes a generally clear or transparent protective screen that is made of glass or polymer material, including polycarbonate. In this case the protective screen may be made of a particularly durable material that can withstand the high pressures associated with extinguishants used in actual or simulated firefighting. The display devices 12 can be arranged in an array, and are arranged in a 2×2 array in the illustrated embodiment. However, the display devices 12 can take other forms and be arranged in various other manners, as desired, such as being mounted on or in other devices, such as props, etc. Each display device 12 may be sealed/generally water-tight to enable the display device to withstand the water forces expelled by the hose 26 as outlined above.

Each display device 12 can generate and display an image to which a user/trainee 20, such as a fire fighter, should respond. For example, each display device 12 can be configured to display a fire image 16 (which can include displayed smoke and/or flame and/or combustible material) or other hazardous conditions. In one case, as shown in FIG. 1, the display devices 12 are networked together such that each display device 12 displays part of a single/unitary composite image 16 that is larger, in one case, than any one of the display devices 12. For example, a large flame or fire may be displayed as the composite image 16, wherein each display device 12 displays only part of the large flame or fire 16, but with continuity between the display devices 12 such that they cooperate to display the larger (flame/fire) image 16.

The trainee 20 may have access to an extinguishant system 22 which sprays/projects a real and/or simulated extinguishant 24 which can be tangible or intangible. For example, in one case the extinguishant system 22 includes a hose 26 which sprays extinguishant 24 that can be directed at the display devices 12. In one particular embodiment, the extinguishant system 22 sprays extinguishant 24 in the form of liquid water at pressures the same as or comparable to those provided by fire hydrants, pump trucks or the like using fire fighter handlines (at least about 50 psi in one case, or at least about 100 psi in another case, or at least about 125 psi in yet another case) to provide a realistic training experience. However, the extinguishant system 22/hose 26 can also spray solids (such as chemical powder, granular solids, etc.), liquids (such as water, foam, or combinations thereof) or gases (such as inert gases including $CO_2$) of various forms.

In some cases the extinguishant system 22 may emit a material that is not necessarily an actual fire extinguishant (or at least not a widely used fire extinguishant, for example, polystyrene foam, rubber or synthetic rubber pellets, sawdust, etc.), but may be easier to use in the training system 10 due to ease of, for example, storing, processing and/or clean up, in the form of a simulated extinguishant. The extinguishant system 22 may also or instead emit a directed signal that is not tangible and not manually detectable by the user (i.e. may not have any noticeable mass), which can be visible or not visible by the user, such as electromagnetic waves (more particularly, visible light, lasers, emissions in the infra-red frequency, etc.), sound waves, or the like. In all cases, however, for the purposes of this document such items as described above emitted by the extinguishant system 22 (including actual, simulated and virtual extinguishants, both tangible and intangible, both visible and invisible) are included in the term "extinguishants."

Each display device 12 can include a sensor system 30 integrated therein or coupled thereto to sense the extinguishant 24 sprayed or directed at the display device 12. Each sensor system 30 can include one or a plurality of sensors 32. In the illustrated embodiment a plurality of sensors 32 are spaced about the front (display) surface of the associated display device 30, and in one case take the form of temperature sensors, such as thermistors, that can react to differing temperatures provided by conduction and/or convection of heat by the extinguishant 24. In the case of a thermistor, an electrical current is passed therethrough, and the change in resistance in the thermistor is measured and used to calculate a change in temperature, which in turn can be used to determine qualities of the extinguishant 24 that is being applied to the sensor 32/sensor system 30/display device 12, including the applied rate, applied volume, type, or other qualities of the extinguishant 24.

Thus in one case the extinguishant 24 may impart cooling to the sensor 32 which changes the sensor's 32 electrical resistance, producing a voltage or change in voltage across the sensor 32, and/or producing a current or change in current through the sensor 32. In the case where the sensor 32 is a thermistor the extinguishant 24 would typically be a fluid or a solid. As further examples, the sensor 32 may include a bimetallic strip that exhibits a change in internal stresses when heated or cooled, or can instead take the form a thermocouple or thermopile. However, the sensor(s) 32 can take any of a wide variety of other forms, including nearly any device having physical or detectable properties that change when an external stimulus, such as a simulated, actual or virtual extinguishant, is applied to the sensor. Other forms of the sensor 32 will be described in greater detail below.

Each sensor 32 can be placed at various positions in the thickness of the associated display device 12. For example, in one case each sensor 32 is placed on the front of (e.g. external to) the protective screen, in one case flush with or mounted directly on an external surface of the protective screen. While this arrangement can provide increased sensitivity, the sensors 32 can be more exposed and prone to damage. Alternatively, each sensor 32 can be placed on the back of (e.g. internal to) the protective screen (but still in front of the light source and mounted directly to the protective screen). This arrangement may provide greater protection, but less sensitivity, depending upon the thermal conductivity or other qualities of the protective screen. In yet another embodiment, each sensor 32 is embedded in the protective screen such as by, for example, forming a hole in the protective screen and securing/potting each sensor 32 in place with a thermally conductive epoxy. In this arrangement the sensor 32 can be recessed relative to both the front and back surfaces of the protective screen and can provide both good sensitivity and protection, but may be more difficult to manufacture in some cases.

It should be noted that the system shown in FIG. 1 and described above relates to a system utilizing multiple display devices 12 arranged in an array. However, it should be understood that the sensor system 30 disclosed herein need not necessarily be used in conjunction with multiple display devices 12, and the sensor system 30 can instead be used in conjunction with only a single display device 12. In addition, while FIG. 1 illustrates the display devices 12 mounted to a wall, the display devices 12 could instead be portable and/or stand-alone devices, or coupled to positioned inside on, or adjacent to other objects, such as props.

The output of each sensor 32 can be provided to the controller 11 of the associated display device 12 and/or other display devices 12, or to an external controller (when utilized). Proper firefighting technique (i.e. where an appropriate extinguishant 24 is aimed at the proper locations for the proper duration and in proper methods) can cause the controller 11 to reduce the size of the displayed fire/flame 16, or cause the displayed fire/flame 16 to grow at a reduced rate. Conversely, relatively poor firefighting technique (i.e. where an improper extinguishant 24 is used, or the extinguishant 24 is not aimed at the proper locations or for improper durations or in improper methods) can cause the controller 11 to increase the size of the displayed fire/flame 16, or cause the displayed fire/flame 16 to grow at an increased rate.

The controllers 11 of the display devices 12 can be configured to display a flame pattern to the trainee 20, or provide natural flame growth based upon fire growth algorithms. In one case, for example, a user/operator may be able to identify a particular location on the display device 12, such as via an infra-red remote control, and indicate that a fire should be initiated at the indicated location to trigger the fire which can grow naturally based upon fire growth algorithms. Alternatively, or in addition, the controller(s) 11 may be able to be controlled by a human operator/trainer to adjust fire conditions on demand, or to change underlying fire conditions on demand which will eventually result in changed flame conditions. The controller(s) 11 can also be coupled to external simulated sources of the heat, smoke, flame, gases, combustion sounds and/or combustion smells, which can also be actuated and controlled in accordance with the displayed fire 16.

The sensor system 30 can utilize solid-state sensors 32 without moving parts to provide a robust, sensitive sensing system 30 integrated into the display(s) 12 that accurately measures trainee performance, without the use of actual flame or fires. The sensor system 30 also enables realistic training exercises whereby trainees 20 can train with high pressure extinguishants which can mirror real-life firefighting scenarios. In addition, the sensors 32 can be positioned directly on/in the display devices 12 such that the sensors 32 are low profile and not visible to the trainee 20, particularly during training exercises, so that the trainee 20 cannot intentionally target only the sensors 32.

Finally, since the sensors 32 are positioned directly on the display device 12 with the displayed image 16 underlying/surrounding the sensors 32, the sensors 32 enable a simulation and response that is highly indicative of how an actual fire would respond. The sensors 32 can thus be positioned in middle portions of the display device 12 (e.g. spaced away from the outer edges/outer perimeter of the display device 12, in front view) and integrated into the fire image 16 such that the fire image 16 surrounds the sensor 32 on all sides. The flameless firefighting system 10 can thereby offer a training experience to similar live burns without the challenges of live burns, which challenges include providing fuel, containing fire and smoke, ensuring safety, complying with regulations, etc.

In some cases, multiple sensors 32 can be combined into a sensor system 30 to provide greater feedback as to the location, movement and amount of extinguishant 24. In one case, each sensor 32 can monitor a particular "zone" on the display device 12. Alternately, each display device 12 can be its own zone, or multiple display devices 12 and/or part thereof can be combined to define a zone. The data associated with each zone, including data relating to displayed fire 16 and/or sensed extinguishant 24, can be combined and processed separately, if desired.

As noted above, the extinguishant sensors 32 can be configured to detect physical interaction with or physical features of the extinguishant 24. However, the extinguishant sensors 32 can also take the form of or include a device which detects emissions in the electromagnetic spectrum including or near the infrared wavelengths, which can be used when the extinguishant 24 takes the form of a virtual extinguishant, such as electromagnetic waves. For example the sensors 32 may include a thermal imaging device such as a thermal camera or an infrared thermometer. The sensors 32 can also include vibration sensors, microphones, capacitive sensor, resistive sensors, reflective sensors and the like.

The extinguishant sensors 32 can be either active or passive. When the extinguishant sensors 32 are passive, they require no or very little power or external heat to function or respond to the effects of the extinguishant 24. However, a passive extinguishant sensor 32 may not experience a large ΔT (change in temperature), or other measured change besides temperature, when exposed to the extinguishant 24, and therefore may not provide high sensitivity. In contrast, an active sensor 32 may be maintained at an elevated or reduced temperature compared to the ambient temperature, which can provide a relatively large ΔT (or other measured change). However, active sensors 32 require a power source which can increase costs and complexity.

Besides elevating or reducing temperature, active sensors 32 can also have voltages, currents, deflections etc. pre-applied thereto to increase their sensitivity. For example, in an active sensor 32, power can be transmitted into an element, such as resistance wire, or a thermistor, or a thermoelectric device such as a Peltier cooler, that has a predefined electrical resistance. The introduced power causes a change (either increase or decrease) in the steady state temperature of the sensor 32 which contrasts with the temperature effects of the extinguishant 24 to measure the effects of the applied extinguishant 24.

When active sensors 32 are utilized, the difference in temperature between the extinguishant 24 and the sensor 32 enables accurate sensing. However, the temperature of the extinguishant 24 and the ambient temperature are not controlled. These variables can affect the responsiveness of the sensors 32 since heat is drawn out of the sensors 32 at varying rates depending on ambient temperature and the temperature of the extinguishant 24.

Therefore the system 10/controller(s) 11 can be configured to receive data relating to, and account for, these variations. For example, the system 10 may include an ambient temperature sensor to measure the ambient air temperature. The system 10 can also be configured to receive data relating to the temperature of the extinguishant 24, which can be entered in a calibration procedure. For example the extinguishant temperature may be able to be detected by creating a pool of stagnant extinguishant 24, and inserting a temperature sensor. Further alternatively, the temperature of the extinguishant can be sensed via a sensor 34 mounted on the nozzle or other locations of the extinguishant system 22

When the active sensors 32 include a heating or cooling element, the heating/cooling element can be either collocated with the sensing element itself, or be positioned separate from the sensing element. An example of the former is a thermistor which can be used both as a heating element and as a temperature sensor. An example of the latter is a heated metal plate that is positioned near a temperature sensor, such as a thermocouple. In this latter configuration, unlike the thermistor, the heater element and temperature sensor are two separate components.

When active sensors 32 are utilized, any of a number of methods or devices can be utilized to increase or decrease the temperature of the sensor 32 to a temperature that is different from the temperature of the extinguishant 24. For example, heat may be added to or produced by the sensor 32 at a constant or varying rate until the sensor 32 reaches a steady state temperature. The amount of power that is input into the sensor 32 may be modulated by the controller(s) 11 using a feedback system. However in some cases the amount of input power may not be modulated and may instead be relatively constant. The controller(s) 11 can change the power provided to the sensor 32 based upon feedback which may be measured by sensor voltage, current, power, resistance, temperature, or combinations thereof.

Detection of the extinguishant 24, and properties thereof, can be accomplished by varying methods and means. For example, in one case the controller(s) 11 track data output by or associated with the sensors 32, such as temperature and power supplied to the sensor 32 to maintain the sensor 32 at the desired temperature. The controller(s) 11 can monitor this data or output from the sensors 32 for a distinguishing feature(s) which suggest contact with the extinguishant 24. The distinguishing feature can be any of a number of metrics, such as a variation from a predicted, target temperature, or power provided to the sensor 32 to maintain a certain temperature, or other variable such as the raw output of a feedback temperature controller.

The controller(s) 11 may receive information from the sensor system 30 to determine a location of the impinging extinguishant 24, such as a centroid 36 of the impinging extinguishant 24, which in turn can be used to determine the extinguishing effect of the extinguishant 24 upon the simulated fire. In one case, for example, the magnitude of the output of each sensor 32 can be utilized to located the centroid 36 of the extinguishant 24. In a simple example the sensor system 30 may take the form of three sensors 32 arranged collinearly on a display device 12. If the right-most sensor 32 provides an output of significantly greater magnitude than either the center or left sensors 32, the controller(s) 11 can conclude that the centroid of the extinguishant 24 is on the right side of the display device 12, and determine the precise location thereof. It should be understood, of course, that sensor 32 locations are not restricted to a line and can in fact be mounted anywhere on a two dimensional plane, or even positioned on different planes in three dimensional space.

The magnitude, amount or volume (collectively termed "magnitude" herein) of expelled extinguishant 24 can also be determined by the controller(s) 11 by, in one case, considering the collective magnitudes of the outputs of all sensors 32. In the case of an actual or tangible extinguishant 24 the actual magnitude or volume can be measured, and in the case of a nontangible extinguishant the projected magnitude or volume can be measured or calculated (e.g. in one case a projected magnitude or volume is determined based upon the simulated fluid flow rate). The volume of the expelled extinguishant 24 can also be detected by sensor 34 on the nozzle/extinguishant system 22, if desired. Magnitude or volume outputs can be measured over various differing times, or an instantaneous volume rate can be determined. However the volume and/or volume rate is determined, such factors can be utilized to track the firefighting activities of the user 20, determine whether the firefighting technique of the user 20 is proper, and/or determine how the simulated fire 16 is adjusted.

The controller(s) 11 may thus be able to determine the location of the centroid 36 and the amount/volume of extinguishant 24, and dynamically adjust the displayed fire 16 accordingly. Moreover, besides considering the volume of the extinguishant, 24 the location of the extinguishant 24, as determined by the centroid 36, envelope of impact 38, or otherwise, can also be considered. If the volume of extinguishant 24 is high and the location is at or near the optimum location, then the cooling capacity for the extinguishant 24 is high and the fire size or growth of the fire can be reduced. In contrast, if the extinguishant 24 volume is reduced and/or the location is moved to a less optimum position, then the cooling capacity of the extinguishant 24 is reduced and fire size or growth of the fire may be increased.

The location of the extinguishant 24 directed onto/impinging upon the display device(s) 12 can be determined in the two dimensional plane of the display device(s) 12 based on the weight or magnitude of output provided by each sensor 32. For instance, spraying the top left of a display device 12 with extinguishant 24 will cause sensors 32/thermistors near the top left of the display device 30 to exhibit a higher output power. In some cases a proportional-integral-derivative ("PID") control loop can be utilized, which causes the sensors 32/thermistors try to maintain the fixed, pre-determined temperature. In contrast, sensors 32/thermistors more distant from the extinguishant location will not exhibit this effect with comparable magnitude. The controller 11, knowing the coordinates of the sensors 32, can then determine the centroid location 36 of the extinguishant 24.

Magnitude/volume/amount of extinguishant 24 can also be determined by a summation of the magnitudes of the output/distinguishing feature of the sensors 32/thermistors, for example, the summation of power injected into all sensors 32/thermistors or the summation of all PID control loop outputs.

The controllers 11 can ascertain the location, magnitude and effect of the applied extinguishant 24 in various other manners besides determining the centroid 36 of the extinguishant 24. For example, the envelope of impact 38 (the total surface area of a display device 12 upon which the extinguishant 24 is impinging) can be determined by the system 10/sensors 32/controllers 11. The envelope of impact 38 can be used to determine the location and/or magnitude of the extinguishant 24. In order to determine the envelope of impact 38, the system 10 may be able to determine part of the outer perimeter of the envelope of impact 38, and extrapolate the remainder of the perimeter. For example, the system 10 may be able to determine the part of the outer perimeter of the envelope of impact 38 is an arc, and then extrapolate the remainder of the arc/circle (as effected by gravity or other factors) to determine the envelope of impact 38, and therefore the location and/or magnitude of applied extinguishant 24.

The controller(s) 11 can take any of a wide variety of forms. In one example a controller 11 includes or takes the form of a thermistor controller board operatively coupled to an adjacent single board computer. The controller board can inject power into the plurality of sensors 32/thermistors based on the output of a PID control routine and simultaneously measure the temperature of each sensor 32/thermistor. The injected power can depend, more particularly, upon changes in the derivative of the output of the PID, and/or changes in the derivative of the temperature profile. The injected power can also depend upon the time variances of when the derivatives of the output of the sensors 32 turn positive or negative, in a differential timing analysis. Thus these algorithms, along with multiple other layered control loops, if desired, can be used to computationally determine the impact zone 38 and the direction and/or flow of the extinguishant 24.

The controller board sends data relating to the power consumed by each sensor 32/thermistor to the single board computer, which in turn processes the data to extract information about directionality and magnitude of the extinguishant 24. Due to the fact that there may be multiple sensors 32/thermistors on the flat surface where extinguishant 24 is being sprayed, the position of the extinguishant 24 can be measured in a two dimensional coordinate space. Again, weights to the sensors 32 can be assigned based on the output or distinguishing feature for each sensor 32/thermistor which can be, for example, the output of a PID loop on-board the thermistor controller board.

As noted above a proportional-integral-derivative controller (PID controller) can be utilized to determine characteristics about the extinguishant 24, such as its direction, location, magnitude and volume. Such PID controllers are control loop feedback mechanisms which calculate an error value based upon the difference between the value and the desired setpoint. The PID controller attempts to minimize the error by adjusting the process through use of a manipulated variable.

A thermistor extinguishant sensor system can be utilized in which the sensors 32 include or take the form of thermistors that are heated to a temperature well above ambient such that cooling the thermistors 32 with the extinguishant 24 results in a noticeable energy exchange from the thermistor 32 to the extinguishant 24. The thermistors 32 should be heated in such a manner that results in temperature stability. Any significant fluctuations caused by temperature overshoot in thermistor temperature could cause false detections. Furthermore, it may be desired that the thermistors 32 reach their target temperatures quickly so that the system can recover from being hit with an extinguishant. A quick recovery time ensures that the thermistors 32 maintain high sensitivity to bursts of cooling i.e. a spray of extinguishant 24 can quickly drain thermal energy of the thermistor 32 to a state where continued sprays of extinguishant 24 do not cause noticeable temperature changes in the thermistor 32. A quick recovery time ensures that the thermistor 32 rises back up to temperature (a sensitive state) before the next spray of extinguishant 24 arrives, allowing the sensing system to sense each spray of extinguishant 24 as separate events, thus allowing for a more realistic training experience.

It is also desirable to drive the thermistors 32 to a repeatable target temperature to ensure a repeatable amount of energy is drained out of the thermistor 32 when it is hit by extinguishant 24. To satisfy these three requirements (system stability, fast rise time, zero target temperature error) simultaneously, an intelligent temperature controller can be implemented. The temperature controller controls the power being injected into each thermistor 32 based upon feedback of temperature error (desired temperature less current temperature). The most reliable and well understood way of simultaneously satisfying the requirements addressed above is to design the temperature controller as a PID controller. The PID controller drives the thermistors 32 with a magnitude equal to the summation of three terms, the proportional term (P), the integral term (I), and the derivative term (D). A mathematical representation of the algorithm utilized by the controller is shown in the following equation, where u(t) is the output power to the thermistor and e(t) is the temperature error.

$$u(t) = k_p e(t) + k_i \int_0^t e(\tau) d\tau + k_d \frac{de}{dt}$$

Each of the three terms has a separate effect. Note that there are gain variables appended to each term to scale the effect of each term. The proportional term simply increases the system response based on the temperature error. The larger the scaling factor for this term ($k_p$), the faster the rise time yet higher the chance of overshoot and system instability. The integral term adds to the system response based on the time history of the temperature error. The effect of this term results in a zero steady state error, causing the final thermistor temperature to exactly equal the target temperature. The larger the scaling factor for this term ($k_i$), the faster the rise time and yet higher the chance of system instability. The derivative term adds to the system response based on the instantaneous rate of change of the temperature error. Increasing the scaling factor ($k_d$) will decrease the system overshoot but may delay the rise time. Selecting the appropriate scaling factors ($k_p$, $k_i$, $k_d$) requires system modeling and/or an experimental procedure in order to meet all desired criteria.

A unique factor of the temperature controller in this case is that the state variables that are output from the PID loop (thermistor power and drive duty cycle) are not isolated to the PID controller. These variables are fed into a detection and centroid calculation algorithm. Thus the PID controller itself can be considered a type of sensor which feeds back into a larger control loop for calculating the effect of extinguishant 24 spray. The centroid detection system utilizes several of these inputs to judge the extinguishant impact zone using normalization and discrimination methods.

This system for monitoring the applied extinguishant 24 enables the system 10 to naturally mimic, predict and train the user's use of the extinguishant 24 in actual firefighting circumstances. A water-can extinguisher, for example, displaces much less water at much lower pressure than a fire fighter handline. The handline is more effective at cooling the fire because of the higher pressure/volume/magnitude. A larger percentage of sensors 32 on the display device 30 are affected by the proper use of a handline than by a water-can extinguisher. The sensors 32 detect/output a higher magnitude due to the increased cooling action which will cause the summation of cooling for the handline to be much larger than the summation of cooling for a water-can extinguisher. Thus, the system 10 can adjust to and automatically accommodate different types of extinguishants applied in differing manners, and provide accurate and realistic simulations that mirrors real world results.

Having described the invention in detail and by reference to the various embodiments, it should be understood that modifications and variations thereof are possible without departing from the scope of the claims of the present application.

What is claimed is:

1. A system for developing firefighting skills including:
a display device configured to display a simulated fire, wherein the display device has a front surface; and
a sensor configured to detect an actual or simulated extinguishant that is directed at said front surface, wherein the sensor is directly coupled to said front surface of said display device, and wherein the system is configured to withstand a liquid stream at a pressure of at least about 50 psi directed at said front surface while continuing to operate and display said simulated fire.

2. The system of claim 1 wherein display device includes a protective screen which defines said front surface, and wherein said sensor is directly coupled to, positioned on or embedded in said protective screen.

3. The system of claim 2 wherein said protective screen is transparent or clear, and said sensor is in direct contact with said protective screen.

4. The system of claim 1 wherein display device includes a protective screen which defines said front surface, and wherein said sensor is positioned in front of said protective screen, or positioned behind said protective screen, or embedded in said protective screen.

5. The system of claim 1 wherein said sensor is spaced away from an outer edge of said screen in front view such that said sensor is configured to be integrated into said fire displayed by said display device such that when said fire is displayed said displayed fire surrounds said sensor on all sides thereof in front view.

6. The system of claim 1 wherein said display device is displaying a simulated fire which surrounds said sensor on all sides thereof in front view.

7. The system of claim 1 wherein the system includes a plurality of sensors configured to detect an extinguishant that is directed at said front surface, wherein each sensor is directly coupled to said front surface of said display device.

8. The system of claim 1 further comprising a controller operatively coupled to said display device and to said sensor, wherein said controller is configured to receive outputs from said sensor and responsively control said simulated fire on said display device.

9. The system of claim 8 wherein said controller is configured to monitor an output of said sensor such that proper use of said extinguishant, as determined by said controller, causes said controller to reduce a size of said fire displayed by said display device.

10. The system of claim 8 wherein said controller is configured to determine a location and a magnitude of said extinguishant.

11. The system of claim 10 wherein said location of said extinguishant includes at least one of an envelope of impact of said extinguishant or a centroid of said extinguishant on said front surface of said display device, and wherein said magnitude of said extinguishant includes an actual volume of said extinguishant, in a case of a tangible extinguishant, or a projected volume of said extinguishant, in a case of a non-tangible extinguishant.

12. The system of claim 1 wherein said sensor is configured to detect at least one of a liquid or a solid or a foam extinguishant.

13. The system of claim 1 wherein said sensor is configured to detect an electromagnetic extinguishant.

14. The system of claim 1 wherein said sensor is configured to measure a change in temperature.

15. A method for developing firefighting skills including:
displaying a simulated fire via display device having a front surface, wherein said display device is water-tight and configured to withstand a liquid stream at a pressure of at least about 50 psi directed at said front surface while continuing to display said simulated fire; and sensing via a sensor an actual or simulated extinguishant that is directed at said front surface, wherein the sensor is directly coupled to said front surface of said display device.

16. A system for developing firefighting skills including:
a display device configured to display a simulated fire; and a sensor system including at least one sensor configured to detect an actual extinguishant and at least one sensor configured to detect a simulated extinguishant that is directed at said simulated fire, wherein said display device is water-tight and configured to withstand a liquid stream at a pressure of at least about 50 psi directed at said display device while continuing to operate and display said simulated fire.

17. The system of claim 16 wherein said sensor system is configured to determine a location and a magnitude of said extinguishant impinging upon said display device.

18. The system of claim 17 wherein said sensor system is configured to responsively control said simulated fire on said display device based upon said sensed location and magnitude of said extinguishant.

19. The system of claim 18 wherein said sensor system is configured to monitor said sensed location and magnitude of said extinguishant over time such that proper use of said extinguishant, as determined by said monitored location and volume over time, causes said sensor system to reduce a size of said fire displayed by said display device.

20. The system of claim 17 wherein said location of said extinguishant includes at least one of an envelope of impact or a centroid of said extinguishant on said display device.

21. The system of claim 17 wherein said magnitude comprises an actual volume in a case of a tangible extinguishant, or a projected volume of said extinguishant in a case of a non-tangible extinguishant, or an envelope of impact of said extinguishant.

22. The system of claim 17 wherein said sensor system includes a controller configured to determine said location and volume of said extinguishant and responsively control said simulated fire on said display device.

23. The system of claim 17 wherein said sensor system includes a plurality of thermistors, each thermistor being operatively coupled to a proportional-integral-derivative controller to determine said location and said magnitude.

24. The system of claim 16 wherein said display device has a front surface, and wherein at least one of said sensors is directly coupled to said front surface of said display device.

25. The system of claim 16 wherein said sensor system is configured to detect at least one of a liquid or a solid or a foam extinguishant.

26. The system of claim 16 wherein said sensor system is configured to detect an electromagnetic extinguishant.

27. The system of claim 16 wherein said sensor system is configured to measure a change in temperature.

28. A method for developing firefighting skills including:
displaying a simulated fire via a display device; and
sensing via a sensor system an actual extinguishant and a simulated extinguishant that is directed at said simulated fire, wherein said display device is water-tight and configured to withstand a liquid stream at a pressure of at least about 50 psi directed at said display device while continuing to operate and display said simulated fire.

29. The method of claim 28 wherein said sensor system is configured to determine a location and magnitude of said extinguishant impinging upon said display device.

* * * * *

UNITED STATES PATENT AND TRADEMARK OFFICE
CERTIFICATE OF CORRECTION

| | | |
|---|---|---|
| PATENT NO. | : 9,773,424 B2 | Page 1 of 1 |
| APPLICATION NO. | : 14/487831 | |
| DATED | : September 26, 2017 | |
| INVENTOR(S) | : Blackburn et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this
Nineteenth Day of June, 2018

Andrei Iancu
*Director of the United States Patent and Trademark Office*